(12) United States Patent
Almlie et al.

(10) Patent No.: US 8,882,926 B2
(45) Date of Patent: Nov. 11, 2014

(54) REMOVAL OF RESIDUAL PARTICULATE MATTER FROM FILTER MEDIA

(75) Inventors: Jay C. Almlie, East Grand Forks, MN (US); Stanley J. Miller, Grand Forks, ND (US)

(73) Assignee: Energy & Environmental Research Center Foundation, Grand Forks, ND (US)

(*) Notice: Subject to any disclaimer, the term of this patent is extended or adjusted under 35 U.S.C. 154(b) by 760 days.

(21) Appl. No.: 13/112,430

(22) Filed: May 20, 2011

(65) Prior Publication Data

US 2012/0291799 A1 Nov. 22, 2012

(51) Int. Cl.
| | | |
|---|---|---|
| *B08B 7/00* | (2006.01) | |
| *B01D 24/46* | (2006.01) | |
| *B01D 46/00* | (2006.01) | |
| *B01D 46/42* | (2006.01) | |
| *B08B 7/02* | (2006.01) | |
| *B01D 46/04* | (2006.01) | |

(52) U.S. Cl.
CPC .......... *B01D 46/0068* (2013.01); *B08B 7/0028* (2013.01); *B01D 46/42* (2013.01); *B08B 7/02* (2013.01); *B01D 46/04* (2013.01)
USPC .......... 134/4; 134/6; 134/7; 134/42; 210/106; 210/108

(58) Field of Classification Search
USPC ........ 134/4, 6, 7, 42; 428/143, 147, 148, 153, 428/154, 163, 167; 210/785, 106, 108
See application file for complete search history.

(56) References Cited

U.S. PATENT DOCUMENTS

| 4,908,068 A * | 3/1990 | Pittman et al. .................... 134/4 |
| 2012/0024312 A1* | 2/2012 | Wilson .............................. 134/1 |

OTHER PUBLICATIONS

"Unveil—Filter-Blinding Reversal Technology", http://www.undeerc.org/commercialization/pdfs/UnveilPDF.pdf, Energy & Environmental Research Center and University of North Dakota, Grand Forks, (Dec. 2005), 2 pgs.

* cited by examiner

*Primary Examiner* — Saeed T Chaudhry
(74) *Attorney, Agent, or Firm* — Schwegman Lundberg & Woessner, P.A.

(57) ABSTRACT

A method for removing residual filter cakes that remain adhered to a filter after typical particulate removal methodologies have been employed, such as pulse-jet filter element cleaning, for all cleanable filters used for air pollution control, dust control, or powder control.

27 Claims, 5 Drawing Sheets

REMOVAL OF RESIDUAL PARTICULATE MATTER FROM FILTER MEDIA

STATEMENT REGARDING FEDERALLY SPONSORED RESEARCH OR DEVELOPMENT

This invention was made with U.S. Government support under the U.S. Department of Energy Cooperative Agreement No. DE-FC26-98FT40320. The government has certain rights in this invention.

BACKGROUND

Filters made from various filtration media and shapes are employed as a particulate pollution control approach for many processes. Typically, many filters are packaged into a housing that may include a few filters to over 10,000 filters. As the filters collect dust from the process, pressure drop builds up across the filter to the point where the filters need to be cleaned. Common cylindrically-shaped bag filters are typically cleaned by a pulse of high-pressure air injected into the top of the filter, which will dislodge much of the dust collected on the outside of the filter elements and allow the dust to fall to a collection hopper. Filters may also be cleaned by mechanical shaking or with a low-pressure, reverse-air mechanism. The filters are typically cleaned as often as every few minutes to as long as several hours. With multiple cleanings, the filters develop high pressure drop over time because of a thin but tenacious amount of residual dust that does not clean off by normal filter cleaning methods. If the pressure drop is too high and the residual dust will not clean off, the filters are said to be blinded. In many cases, the filters have to be replaced, not because they are worn, but because of the high pressure drop due to filter blinding.

To minimize the size of a filter housing containing filters, it is desirable for it to operate at a high filtration velocity, called air-to-cloth ratio (A/C ratio). One of the biggest obstacles to operation of large-scale filter housings at high A/C ratios is removing the residual dust from the filters. The general term for the flow resistance due to the dust left on the filters after normal cleaning is "residual drag," which is simply the pressure drop across the filter divided by the filtration velocity. For a fabric type filter operating at an A/C ratio of 12 ft/min that has an after-cleaning pressure drop of about 6-in. W.C., the residual drag would be 0.5-in. W.C./ft/min. This compares with a new fabric type filter having a residual drag of only about 0.1-in. W.C./ft/min for a typical membrane fabric. Many times filter residual drag may reach a value over 1.0-in. W.C./ft/min, which means significant power is required by a fan maintaining gas flow overcoming the high residual drag of a filter. Further, the filtering process may also be limited by the fan's capacity to draw gas flow through the filter. The major incentive to operate these filters at as high of an A/C ratio as possible is economic advantage.

SUMMARY

The present subject matter relates to a method for removing residual particulate matter that remains adhered to a filter even after typical filter cleaning methodologies have been employed, such as pulse jet filter cleaning. It applies to all cleanable filters used for air pollution control, dust control, or powder product capture.

A method for removing residual particulate matter from a filter in a particulate matter control device comprising applying an adhesive substance to the surface of the filter where the substance adheres to the residual particulate matter on the filter; and removing the residual particulate matter from the filter by removing the adhesive substance from the filter together with at least a portion of the residual particulate matter.

Additionally, a method for reducing residual filter drag of a filter by lowering such filter residual drag of a filter thereby enabling greater system efficiencies by decreasing the power required to operate blowers. The method of reducing residual particulate matter from a filter also greatly increases the lifespan of a set of filter bag type filters, reducing labor and material costs. Finally, it offers a method by which more aggressive filter designs may be utilized where pressure drop and filter blinding were once limiting factors.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
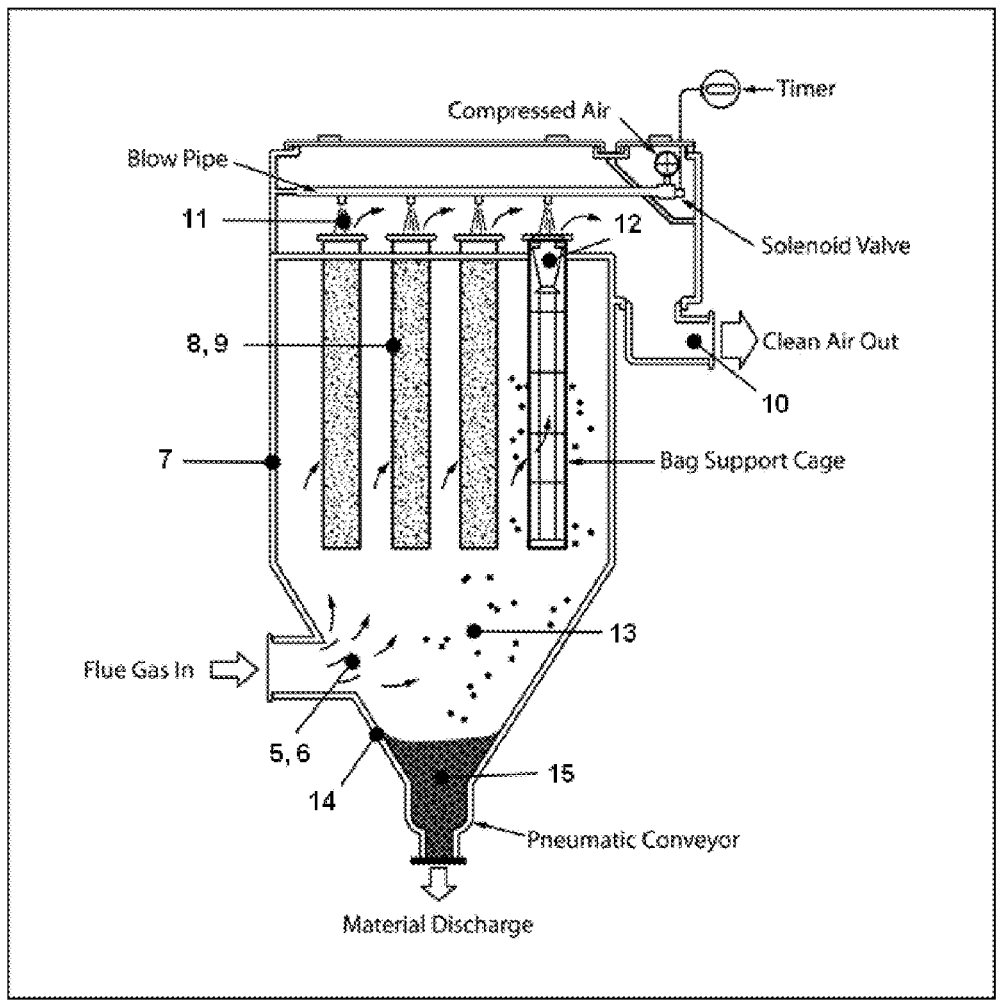
FIG. 1 is a schematic of a typical pulse-jet filter arrangement.

The term "particulate matter (PM)" as used herein refers to a substance that consists of separate particles, especially airborne pollution, that can be controlled by collection on a filter. The particulate matter, once collected on a filter typically has the consistency of a bulk powder.

The term "filter" as used herein refers to a device made of or containing a porous material used to collect particles from a liquid or gas passing through it.

The term "filter cake" as used herein refers to the particulate matter that accumulates on a filter used to collect particles from a gas or liquid stream.

The term "residual particulate matter" as used herein refers to the particulate matter that remains on a filter after the filter has been cleaned by ordinary process methods.

The term "filter blinding" as used herein refers to the condition where a filter becomes plugged with residual particulate matter so that adequate gas flow through the filter is no longer possible.

The terms "pressure drop" and "differential pressure", as used herein refer to the difference in static pressure between the upstream and downstream sides of a filter because of the energy loss that occurs from forcing gas flow through the filter.

The term "in. W.C." as used herein refers to inches of water column, a common unit of pressure or pressure drop in industrial processes.

The term "adhesive substance" as used herein refers to a material that has the properties such that it will adhere to other materials that it contacts.

The term "A/C Ratio" as used herein refers to air to cloth ratio, also called face velocity, is the volume flow rate of a gas through a filter divided by the cross sectional area of the filter.

The term "pulse-jet" as used herein refers to a method used in industrial filters to remove a filter cake from the filter where a short pulse or jet of high-pressure air is directed to the inside of a cylindrical filter element which momentarily reverses the direction of gas flow through the filter and dislodges the filter cake from the outside of the filter.

The term "gelatine" as used herein refers to a highly processed substance made from the hides and bones of bovine, equine, and porcine animals.

The term "starch" as used herein refers to a fine, powdery flour from the endosperm of a grain food or from the root of a plant or similar synthetic materials.

The term "fluoroelastomer" as used herein refers to any of a class of fluorinated long-chain polymers with an intrinsic quality of high stretchability.

In embodiments, the present subject matter reduces the residual filter drag caused by excessive residual particulate matter buildup. Because this residual buildup is not removable by normal operational methods, the present subject matter also greatly reduces filter blinding over time. One advantage of the present subject matter is to increase the cost-effectiveness of filter baghouses and other filtration systems by reducing filter element replacement costs over time. Another advantage is to decrease system power consumption during normal bag operation by decreasing mean airflow resistance during the lifetime of a filter element. Another advantage is to permit expansion of the operational envelope of the filter system, resulting in a more aggressive design to permit higher airflow, a smaller footprint, and lower overall capital costs.

In some embodiments, the subject matter is a method for removal of residual filter cake, including injecting an adhesive substance into the filter housing, collecting the adhesive on the surface of the targeted filter elements, drying or curing the adhesive coating, and removing the adhesive coating along with the residual PM.

In one example, the adhesive substance is comprised of an environmentally friendly substance, causing no undue effects to the environment after disposal. In some embodiments, adhesive substances may include a food-type gelatine solution, various starch solutions (produced from any of a family of specific food starches), a dilute fluoroelastomer solution, or a combination thereof. Cured fluoroelastomers can typically be stretched up to 400% with no hysteresis. Fluoroelastomers also possess a superior resistance to chemical attack. The fluoroelastomer class may provide a benefit in that a cured fluoroelastomer will stretch, but not adhere tightly to many surfaces, thus enabling easy release from the filter surface.

In embodiments, a variety of adhesive substances may be used within this description because a number of different materials produce similar results in terms of residual PM removal. Such adhesive substances will all attach to and partially permeate a residual filter cake, dry and set, and be easily removed from the filter by one of the methods described herein.

Referring now to FIG. 1, there is shown a schematic of a typical pulse-jet filter arrangement. In a typical filter system, particulate matter 5 borne within the flow of gas 6 into the filter housing 7 collects in the form of filter cake 8 on the surface of cylindrical filters 9. The particulate matter is thus disengaged from the gas stream, and a PM-free gas stream 10 exits the filter housing. Either on a timed cycle or on a cycle triggered by pressure drop across the filters, a pulse of air 11 is directed into the internal volume 12 of the individual filters, causing momentary and powerful reversal of gas flow. Filter cake 13 is dislodged from the filter surface and falls into the filter hopper 14 and is eventually removed via screw conveyor 15 or pneumatic discharge.

Filter blinding may occur rapidly, within a short time of a week or less, or more slowly, within a time of several months to a year or more. In either case, the filter blinding limits the gas flow through the filter so that normal operation is no longer possible due to high pressure drop across the filter. To restore normal operation would require expensive replacement of the filter, even though the filter is not otherwise deteriorated. Described is a method to reverse the effects of filter blinding, greatly extending the life of the filter.

Figure 2:
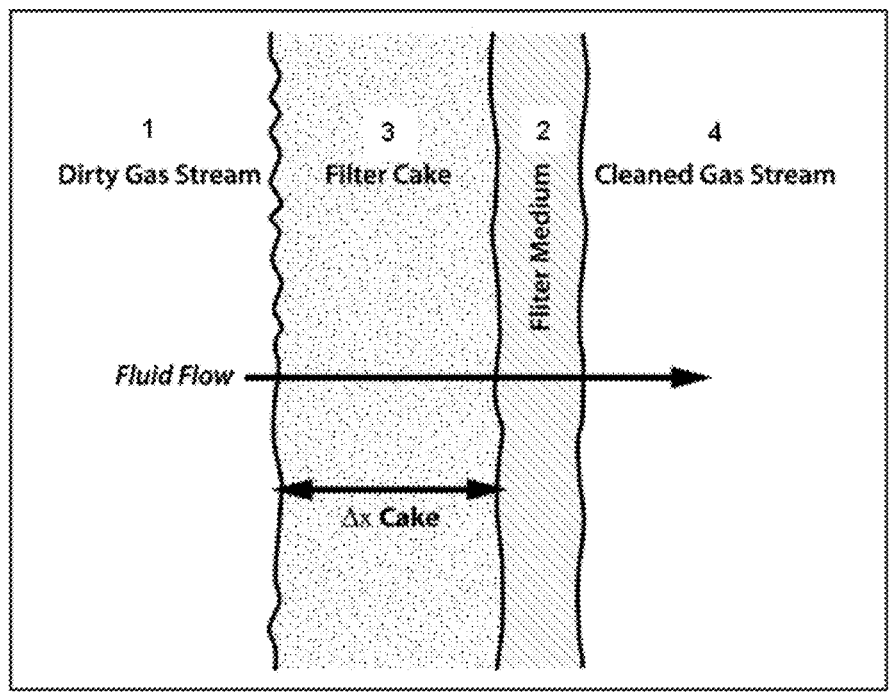
FIG. 2 is a schematic of particulate matter (PM) carried within a dirty gas stream 1 and collected on the surface of a filter 2, termed "filter cake 3".

Referring now to FIG. 2, there is shown a schematic of how PM accumulates on the filter to create a filter cake. Specifically, FIG. 2 is a schematic of particulate matter (PM) carried within a dirty gas stream 1 and collected on the surface of a filter 2, termed "filter cake 3". Fluid flow (typically gaseous) carries PM to the surface of the filter, which acts as a barrier to solid matter, but allows gas to flow freely through it. The PM is deposited and builds thickness. A gas stream 4 free of PM exits the filter housing.

Figure 3:
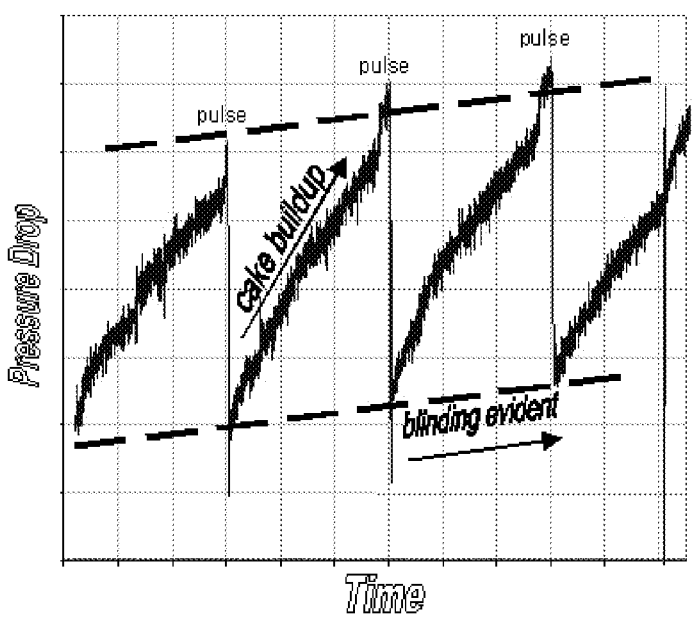
FIG. 3 is a plot depicting typical filter blinding phenomena encountered in many filter applications.

Referring now to FIG. 3, there is shown a plot depicting typical filter blinding phenomena encountered in many filter applications. Over a relatively short span of time, filter cake grows thicker, causing a steady rise in pressure drop across the filter as shown by the ramping rise in pressure. A cleaning mechanism occasionally dislodges filter cake, thus sharply decreasing the pressure drop across the filter, as shown by the near-vertical drop in pressure coincident with the pulses. However, typically, the pressure drop caused by dislodging the filter cake is less than the pressure drop caused by the accumulation of the filter cake, and thus, over a longer span of time and successive cleaning efforts, the residual pressure drop present after the cleaning process increases with each pulse. This is due to incomplete removal of the filter cake during each successive cleaning process. This is known as "filter blinding" and is depicted by the generally rising trend in both the peak pressures and minimum pressures for the cycles shown.

Figure 4:
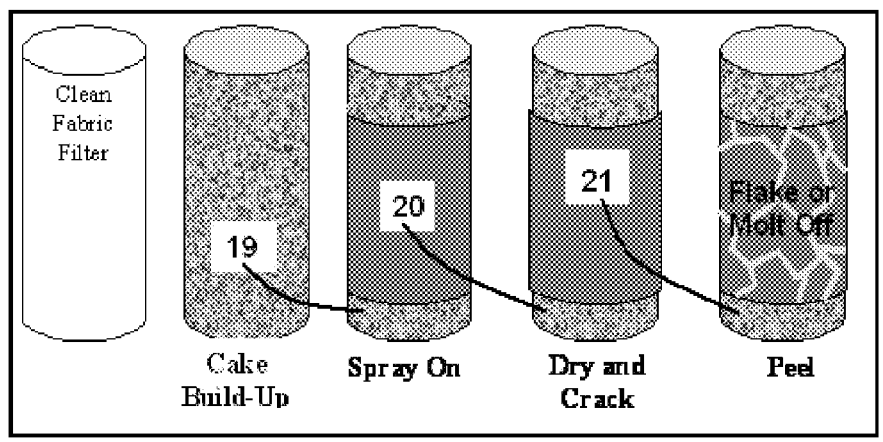
FIG. 4 includes a series of samples associated with the present subject matter.

FIG. 4 includes a sequence of elements associated with an example of the present subject matter. The left-most illustration represents a clean fabric filter at a time prior to exposure to particulate matter. The next illustration represents cake build-up 19 (also referred to as a blinded filter 19). The next illustration in the sequence illustrates spray on 20 and, as shown, this is distributed on the cake build-up. The adhesive substance dries and begins to crack 20. The next illustration depicts dry and crack 21 (autoinitiation of peeling and sloughing begins). The right-most illustration depicts flake or molt off and is marked 'peel' in which the peeling adhesive substance and attached particulate matter from the residual filter cake is sloughed off the filter 21 either naturally with help from gravity or by use of a conventional filter cleaning mechanism such as, but not limited to, pulse-jet cleaning or reverse gas cleaning.

With any of the adhesives described herein, the method of introduction may be the same. In some embodiments, the adhesive substance may be injected into the filter housing via the inlet process gas stream, via an auxiliary inlet, or via direct application to the filter elements with a spray mechanism or by dripping or pouring of the adhesive substance. In embodiments where the introduction occurs via inlet process gas stream or auxiliary inlet, the adhesive should be atomized to a mean particle size capable of being carried by the process gas stream to the filter surface. At a small enough mean particle diameter, the aerodynamic effects of the process gas stream overpower the effects of gravity, causing the particles to be entrained in the flow rather than pulled down by gravity. In other embodiments where direct application occurs, inertial effects of the mean velocity vector of the atomized material spray overpower the effects of gravity in a similar manner. It should be appreciated by those skilled in the art that other alternative injection techniques are also possible.

Figure 5:
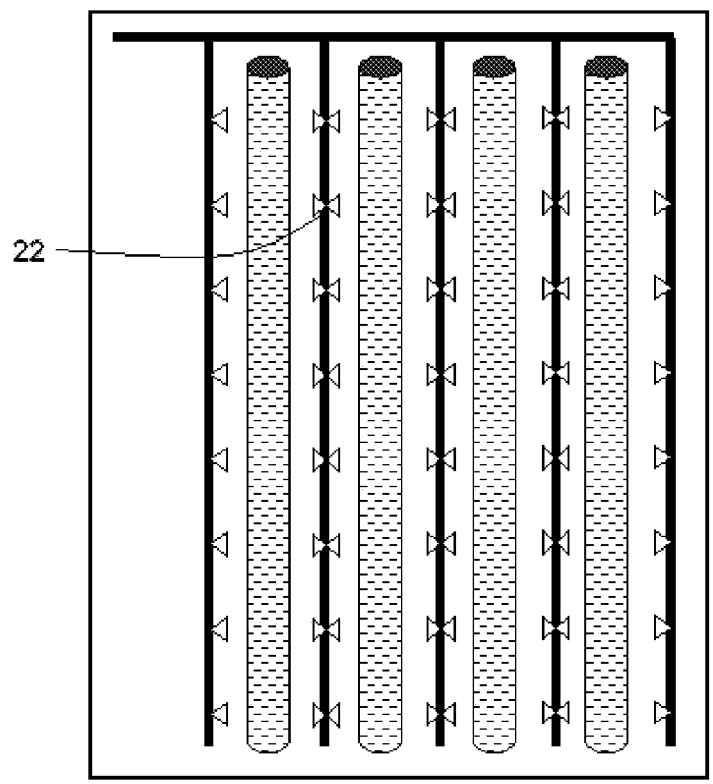
FIG. 5 is a schematic of the adhesive substance sprayed directly and uniformly onto all filter elements via an array of nozzles 22 dispersed throughout the filter housing.

Referring now to FIG. 5, there is shown a schematic of the adhesive substance sprayed directly and uniformly onto all filter elements via an array of nozzles 22 dispersed throughout the filter housing.

Figure 6:
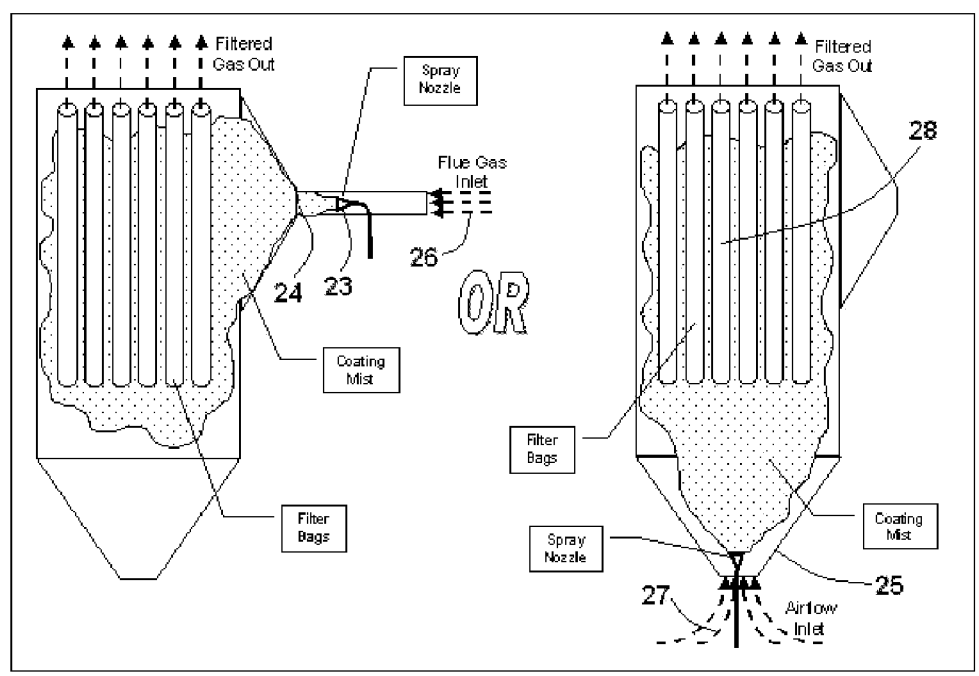
FIG. 6 is a schematic of the adhesive substance 23 sprayed indirectly and uniformly onto all filters via nozzles mounted in either the primary gas inlet 24 or a secondary gas inlet 25.

Referring now to FIG. 6, there is shown a schematic of the adhesive substance 23 sprayed indirectly and uniformly onto all filter elements via nozzles mounted in either the primary gas inlet 24 or a secondary gas inlet 25. The adhesive substance is entrained in the inflow 26, 27 of gas and carried to the surface of the filters 28.

In one example of an injection method, the adhesive substance is drawn to the filter surface, collecting there to a predetermined thickness. This adhesive substance coating partially permeates the residual filter cake as it dries or cures in place. Because it partially permeates the residual filter cake, the adhesive substance entraps a large portion of the particulate matter comprising the residual filter cake within the matrix of the drying coating. When the coating is dry, it can then pull the residual filter cake away from the surface of the filter via various methods known to those skilled in the art, such as a pulse of gas injected into the filter element(s). Collection of the adhesive substance, drying of the material, and removal of the adhesive substance coating can all occur with or without process gas or airflow through the filter. Additionally, removal of the adhesive substance coating may occur with or without heat, utilizing natural air flow.

As an example, it was observed that the filter cakes tested all exhibited a somewhat hydrophilic nature. Many of the water-based, low-surface-tension solutions tested, such as gelatine solutions, cornstarch solutions, and a commercial water-based liquid mask product, were drawn into the filter cake by capillary action. Because the filter cake had been absorbed into the matrix of the drying coating, it remained embedded in the matrix of the coating upon completion of the drying process. As the coating dried, it began to crack and peel because of the chemistry of the drying of hydrated starch. The filter cake particles were then peeled away from the filter surface along with the dried starch matrix. As an integral part of the process, the peeling phenomenon occurred without filter pulsing or other external force.

Starch chemistry holds the explanation of this phenomenon of autoinitiation of cracking and peeling of the drying coating. Cornstarch comprises two different base monomers: approximately 25% amylose and 75% amylopectin. Amylose is a linear chain of glucose molecules. Amylopectin is a branched chain of glucose molecules. Amylose is water-soluble and will form a gel because of hydrogen bonding between the linear chains. Amylopectin is not soluble in water but will cause a suspension to thicken because of its branched structure.

When a slurry of cornstarch in water is heated, the cornstarch granules absorb water and swell. Near the slurry's gelatinization temperature, the granules absorb even more water and lose their crystalline structure. This structural change is irreversible. Starch molecules begin to leach out of the swollen granule, and the mixture becomes a viscous solution.

Upon drying on the filter, autoinitiation of cracks in the drying coating becomes apparent. Also, a curling effect beginning at these cracks is evident. This can be explained by a number of mechanisms. First, acids hydrolyze ("cut with water") glucosidic bonds in the starch solution. These cuts are the sites of many of the autoinitiated cracks in the drying cornstarch coating. Agitation due to syneresis (loss of water) in the drying solution, is also responsible for the destruction of some of the swollen granules, causing further breaks in the coating.

The curling effect can be explained by mass-transfer effects within the adhesive substance coating. The outside depths of the coating farthest from the hydrophobic membrane of the filter dry first. The evaporation of water causes the granules to shrink. The granules farther upstream in the airflow will shrink faster. This dehydration gradient within the coating depth causes the coating to curl in the direction of the driest layers in the coating.

Figures 7A, 7B, 7C:
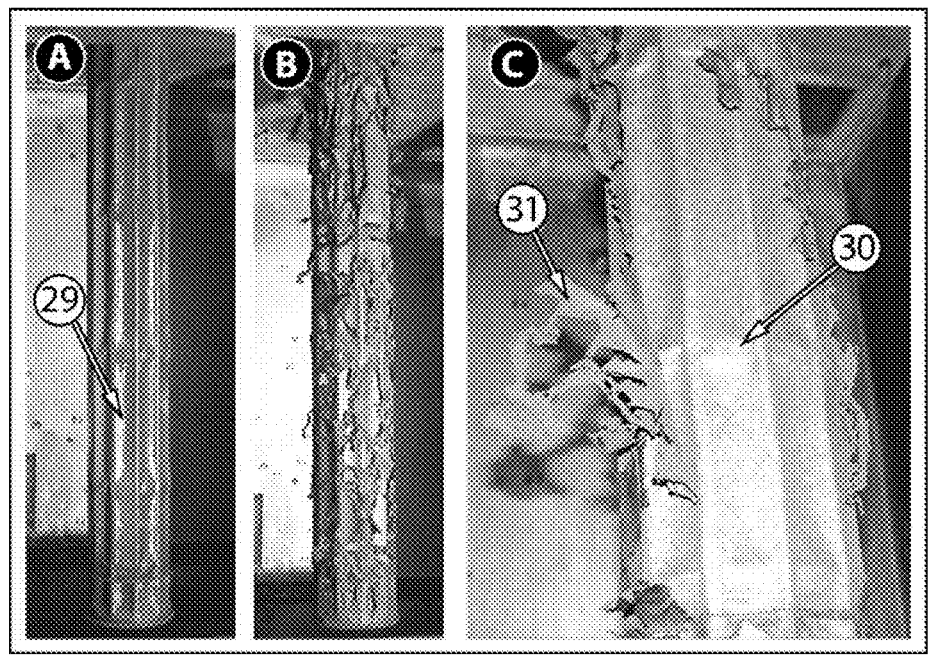
FIG. 7A, FIG. 7B, and FIG. 7C include photographs showing results of the coating and drying process after deposition of the adhesive substance onto blinded filters.

Referring now to FIG. 7, there is shown a series of photographs detailing the expected results of the coating and drying process after deposition of the adhesive substance onto blinded filters. FIG. 7A of the photograph shows the appearance of an aqueous starch solution embodiment of the present subject matter just after deposition of the adhesive solution onto the blinded filter bag. Note the wet appearance 29 and uniform coating thickness. FIG. 7B shows the effects of drying of the applied adhesive substance, and subsequent autoinitiation of peeling and soughing of the adhesive/PM mixture away from and off of the clean filter surface. FIG. 7C shows the nearly completely restored surface 30 of the filter with all residual cake removed 31 in many areas. Successive pulses will completely remove the remains of the adhesive substance and residual filter cake bonded to the adhesive substance.

Figure 8:
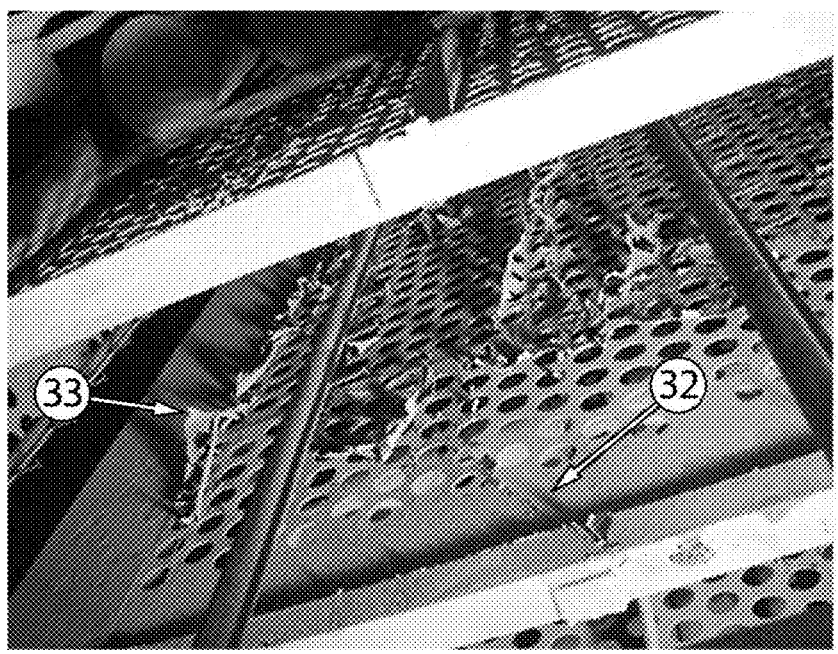
FIG. 8 is a photograph detailing the results of the coating and drying process after deposition of the adhesive substance onto alternate filter surfaces 32.

Referring now to FIG. 8, there is shown a photograph detailing the expected results of the coating and drying process after deposition of the adhesive substance onto alternate filter surfaces 32. In this embodiment, the filter surface 32 is metallic instead of more common fabric filter media. A peeling and sloughing action similar to that observed in FIG. 7 is observed here 33.

EXAMPLES

As a specific example, a cornstarch solution (146 grams of cornstarch per liter of water) at 140° F. was directly applied to the filter cake. As the solution dried, it encased much of the persistent residual filter cake within the matrix. A property of this cornstarch solution is that it cracks apart as it dries, peeling away from the fabric filter surface as it dries. This greatly enhances the efficacy of the procedure, requiring less forceful removal mechanisms. The remaining, clinging flakes of filter cake-laced coating can be easily removed with a mechanism such as a pulse-jet of gas typically used in pulse-jet cleaned filter systems.

In addition to cornstarch solution of 146 grams of cornstarch per liter of water, other solutions or concentrations are also contemplated. For instance, other examples include a coating material including cornstarch at a ratio of cornstarch 122 grams per liter, 104 gm/L, or other ratio. In one example, the coating material includes gelatin at a ratio of 14 gm/L.

Referring again to FIG. 7A shows a filter laden with a residual filter cake immediately after being sprayed with a cornstarch solution. FIG. 7B shows the cornstarch coating after the coating has completely dried. Note that no pulse has yet been imparted to the bag. All peeling evident in this frame is solely a function of the chemistry of the starch dehydration. Finally, FIG. 7C shows a close-up of the bag surface after filter element pulsing has taken place. Note the like-new condition of the filter fabric.

In summary, as described herein there are many benefits to using the method described herein, including restoring the permeability of a used filter, reversing the blinding of a filter, increasing the lifespan of filter media, increasing the average face velocity of a filter, reducing the pressure drop across a filter, reducing the energy required to move gas through the filter, and reducing the energy required to clean the filter media.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. For example, a computer operated system can be configured to deliver a coating material in response to a timing signal or in response to a measured parameter (such as a differential pressure). A computer can be configured to control delivery of the coating material and control the operation of other systems configured to remove the particulate.

Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for removing residual particulate matter from a filter in a particulate matter control device, the method comprising:
   applying an adhesive substance to a surface of the filter for the adhesive substance to adhere to at least a portion of the residual particulate matter on the surface of the filter; and
   removing the residual particulate matter from the filter by removing the adhesive substance from the filter together with at least a portion of the residual particulate matter.

2. The method of claim 1, wherein at least a portion of the adhesive substance permeates a portion of a filter cake formed by the residual particulate matter on the filter.

3. The method of claim 1, wherein applying an adhesive substance includes forming a coating of the adhesive substance to adhere to a portion of the residual particulate matter on the filter.

4. The method of claim 3, wherein the removal process includes flaking off of the coating from a portion of the surface of the filter.

5. The method of claim 1, wherein the removing at least a portion of the residual particulate matter includes the use of a dehydration gradient and associated contracting chemical bonds of the coating to cause the adhesive substance to peel from the surface of the filter for attached or embedded residual particulate matter to peel away from the filter surface.

6. The method of claim 1, wherein applying the adhesive substance onto a surface of the filter includes spraying the adhesive substance into the particulate matter control device having a filter.

7. The method of claim 6, wherein applying the adhesive substance includes injecting a spray of the adhesive substance into a gas duct upstream of the particulate matter control device having a filter for transporting the spray onto the surface of the filter.

8. The method of claim 7, wherein the spray is injected into the gas duct upstream of the particulate matter control device having a filter during operation of the particulate matter control device.

9. The method of claim 7, wherein the spray is injected into the gas duct upstream of the particulate matter control device having a filter during ambient conditions.

10. The method of claim 6, wherein applying the adhesive substance includes using nozzles in a secondary gas inlet to cause the spray to be carried onto the surface of the filter.

11. The method of claim 1, wherein applying the adhesive substance includes applying the adhesive substance directly onto the surface of the filter.

12. The method of claim 1, wherein applying the adhesive substance includes applying the adhesive substance substantially uniformly to a portion of the surface of the filter.

13. The method of claim 1, wherein applying the adhesive substance includes applying the adhesive substance by dripping or pouring the adhesive substance onto a portion of the surface of the filter.

14. The method of claim 1, wherein the adhesive substance includes one of a solution or suspension of starches, gelatines, and other polymers.

15. The method of claim 1, wherein removing the residual particulate matter includes removing the residual particulate matter from a portion of the surface of the filter by pulse cleaning of the filter.

16. The method of claim 1, wherein removing the residual particulate matter includes removing the residual particulate matter from the portion of the surface of the filter by brushing the portion of the surface of the filter, shaking the filter, using an air-jet on the portion of the surface of the filter, and using acoustical energy directed to the portion of the surface of the filter.

17. The method of claim 1, further comprising drying a portion of the surface of the filter using one of heated air, unheated air, or drying using substantially no heat and no air.

18. A method for removing at least some particulate matter and residual particulate matter from a filter in a particulate matter control device, the method comprising:
removing at least a portion of the particulate matter from a filter in a particulate matter control device;
applying an adhesive substance to the surface of the filter where the adhesive substance adheres to the residual particulate matter on the filter; and
removing the residual particulate matter from the filter by removing the adhesive substance from the filter together with at least a portion of the residual particulate matter.

19. The method of claim 18, wherein at least a portion of the adhesive substance permeates a portion of a filter cake formed by the residual particulate matter on the filter.

20. The method of claim 18, wherein applying an adhesive substance includes forming a coating of the adhesive substance to adhere to a portion of the residual particulate matter on the filter.

21. The method of claim 18, wherein the removing at least a portion of the residual particulate matter includes the use of a dehydration gradient and associated contracting chemical bonds of the coating to cause the adhesive substance to peel from the surface of the filter for attached or embedded residual particulate matter to peel away from the filter surface.

22. The method of claim 18, wherein applying the adhesive substance onto a surface of the filter includes spraying the adhesive substance into the particulate matter control device having a filter.

23. The method of claim 22, wherein applying the adhesive substance includes injecting a spray of the adhesive substance into a gas duct upstream of the particulate matter control device having a filter for transporting the spray onto a the surface of the filter.

24. The method of claim 23, wherein the spray is injected into the gas duct upstream of the particulate matter control device having a filter during operation of the particulate matter control device.

25. The method of claim 24, wherein the spray is injected into the gas duct upstream of the particulate matter control device having a filter during ambient conditions.

26. The method of claim 25, wherein applying the adhesive substance includes using nozzles in a secondary gas inlet to cause the spray to be carried onto the surface of the filter.

27. A method for reducing residual filter drag for a filter having particulate matter on at least a portion thereof, the method comprising:
applying an adhesive substance to the surface of the filter where the adhesive substance adheres to the residual particulate matter on the filter; and
removing the residual particulate matter from the filter by removing the adhesive substance from the filter together with at least a portion of the residual particulate matter.

* * * * *